US006825872B2

(12) United States Patent
Chikano

(10) Patent No.: US 6,825,872 B2
(45) Date of Patent: Nov. 30, 2004

(54) IMAGE FORMING APPARATUS HAVING VENTILATING DEVICE

(75) Inventor: Hisao Chikano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 44 days.

(21) Appl. No.: 10/042,147

(22) Filed: Jan. 11, 2002

(65) Prior Publication Data
US 2002/0089582 A1 Jul. 11, 2002

(30) Foreign Application Priority Data

Jan. 11, 2001 (JP) ........................................ 2001-003980
Feb. 19, 2001 (JP) ........................................ 2001-041112
Dec. 14, 2001 (JP) ........................................ 2001-380871

(51) Int. Cl.[7] .............................................. B41J 2/435
(52) U.S. Cl. ...................................................... 347/263
(58) Field of Search ................................ 347/228, 242, 347/245, 252, 241, 256, 263, 138, 152; 399/1, 70, 71, 92, 93, 94; 454/64, 66

(56) References Cited

U.S. PATENT DOCUMENTS

| 5,185,629 | A | * | 2/1993 | Iino et al. ....................... 399/93 |
| 5,194,879 | A |   | 3/1993 | Kotabe et al. ................. 347/254 |
| 5,307,132 | A | * | 4/1994 | Tsuchiya ......................... 399/70 |
| 5,424,806 | A | * | 6/1995 | Siegel ............................... 399/1 |
| 5,510,827 | A | * | 4/1996 | Kubota et al. ................. 347/257 |
| 5,610,724 | A |   | 3/1997 | Kaneko et al. ................ 358/400 |
| 5,659,860 | A |   | 8/1997 | Sasaki et al. .................. 399/267 |
| 5,758,241 | A |   | 5/1998 | Oyama et al. ................. 399/272 |
| 5,771,429 | A |   | 6/1998 | Oyama et al. ................. 399/260 |
| 5,805,965 | A |   | 9/1998 | Tsuda et al. ................... 399/281 |
| 5,822,664 | A |   | 10/1998 | Oka et al. ..................... 399/284 |
| 5,857,132 | A |   | 1/1999 | Mizuishi et al. ................ 399/66 |
| 5,983,059 | A |   | 11/1999 | Oka et al. ..................... 399/262 |
| 6,091,912 | A |   | 7/2000 | Kitajima et al. ................ 399/13 |
| 6,151,471 | A |   | 11/2000 | Yahata et al. ................. 399/258 |
| 6,307,640 | B1 |  | 10/2001 | Motegi ........................ 358/1.14 |
| 6,509,975 | B1 |  | 1/2003 | Motegi ........................ 358/1.14 |
| 6,535,702 | B1 |  | 3/2003 | Takatsu ........................... 399/81 |

FOREIGN PATENT DOCUMENTS

| JP | 3-54913 | 5/1991 | |
| JP | 04337750 A | * 11/1992 | .......... G03G/15/00 |
| JP | 5-5851 | 1/1993 | |
| JP | 8-262959 | 10/1996 | |
| JP | 11-52267 | 2/1999 | |
| JP | 200113856 A | * 1/2001 | .......... G03G/21/20 |

OTHER PUBLICATIONS

U.S. patent application Ser. No. 10/042,147, Chikano, filed Jan. 11, 2002.
U.S. patent application Ser. No. 10/637,690, Shindoh et al., filed Aug. 11, 2003.
U.S. patent application Ser. No. 10/743,865, Matsumoto et al., filed Dec. 24, 2003.
U.S. patent application Ser. No. 10/692,792, Kizaki et al., filed Oct. 27, 2003.
U.S. patent application Ser. No. 10/694,062, Kizaki et al., filed Oct. 28, 2003.
U.S. patent application Ser. No. 10/452,295, Kawahara et al., filed Jun. 3, 2003.
U.S. patent application Ser. No. 10/384,595, Tsukuba et al., filed Mar. 11, 2003.

* cited by examiner

Primary Examiner—Hai Pham
(74) Attorney, Agent, or Firm—Oblon, Spivak, McClelland, Maier & Neustadt, P.C.

(57) ABSTRACT

An image forming apparatus having a ventilating device that can effectively cool heated components and remove ozone produced in the apparatus. The image forming apparatus includes a writing device. Upper and lower ducts are provided to the writing device having a housing of the writing device therebetween to form an outside-air flowing path on and beneath the writing device. Outside-air intaken by an air intake fan flows through the upper and lower ducts separately. In the writing device, scanning optical components, such as an fθ lens, and a mirror formed of a plastic are disposed.

16 Claims, 7 Drawing Sheets

IMAGE FORMING APPARATUS HAVING VENTILATING DEVICE

BACKGROUND OF THE INVENTION

1. Field of the Invention

The present invention relates to an image forming apparatus, such as a copying machine, a facsimile, a printer, a multifunctional image forming apparatus having a plurality of image forming functions, and other similar devices, and more particularly to the image forming apparatus having a ventilating device that can effectively cool heated components and remove ozone produced in the apparatus.

2. Discussion of the Background

In a writing device to be used in an image forming apparatus, beam light such as laser beam light is emitted from a light source based on a signal of a read image. The laser beam light is deflected by a polygon mirror. The deflected light is then led to a surface of an image bearing member through an fθ lens and a mirror to form an image on the surface thereof.

A scanning optical component in the writing device, such as the fθ lens and mirror are formed of a plastic or a glass. Because of a growing request for a cost reduction and with the development of processing techniques, an increased number of components formed of a plastic are used in recent years.

However, the components formed of a plastic expand and become deformed according to a rise in a surrounding temperature, which may generate an image distortion. Recently, a risk of the generation of the image distortion is increased because the temperature in the apparatus tends to increase quickly due to a higher rotating speed of the polygon mirror and an increased heating value of a fixing device.

In addition, a housing made of an aluminum die casting, which has a high thermal conductivity, is frequently employed for the writing device to assure accuracy, high rigidness, and resistance to vibration. Thus, heat from a heat source is well conducted to the scanning optical system.

In Japanese Patent Laid-Open Publication No. 5-5851 and Japanese Utility Model Laid-Open Publication No. 3-54913, an image forming apparatus is discussed in which ventilation of a surrounding of a writing device is improved to suppress an increase in a temperature, thereby preventing an occurrence of an image degeneration.

However, in the above-described image forming apparatus, great attention is paid to cooling the polygon mirror. A principal objective is to protect the polygon mirror itself. Thus, when scanning optical components, such as the fθ lens and mirror are formed of a plastic, a thermal expansion of these components is not sufficiently suppressed.

SUMMARY OF THE INVENTION

The present invention has been made in view of the above-mentioned and other problems and addresses the above-discussed and other problems.

The present invention advantageously provides a novel image forming apparatus having a ventilating device for effectively cooling a writing device to prevent scanning optical components disposed in the writing device from being excessively heated, thereby preventing a thermal expansion of the components in the writing device. Thus, a generation of an image distortion and an occurrence of image degeneration are prevented. In addition, an airflow that cooled the components removes ozone produced in the apparatus. According to an example of the present invention, the image forming apparatus includes a writing device. Upper and lower ducts are provided to the writing device having a housing therebetween to form an outside-air flowing path on and beneath the writing device. Outside-air intaken by an air intake fan flows through the upper and lower ducts separately. Scanning optical components, such as an fθ lens, and a mirror formed of a plastic are disposed in the writing device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
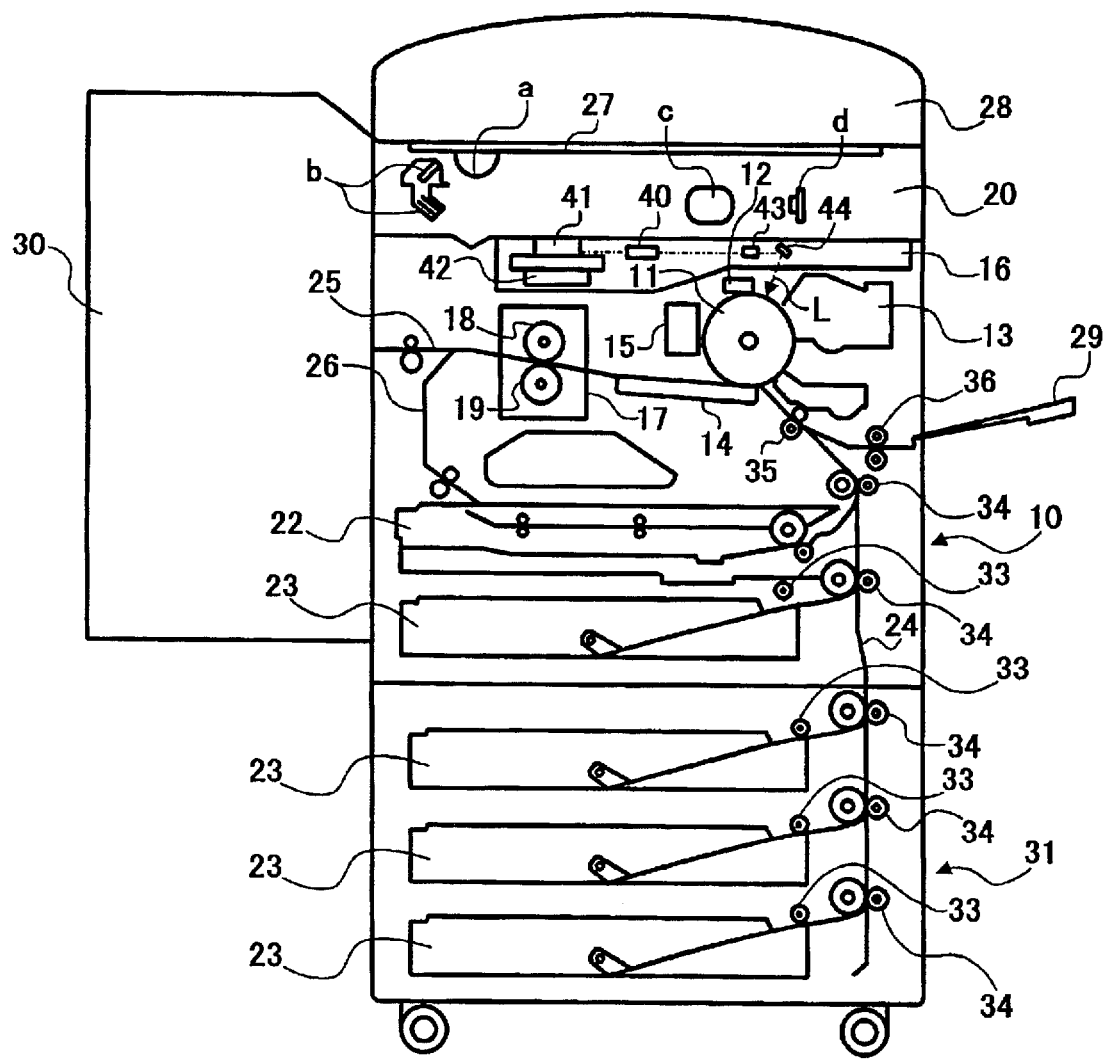
FIG. 1 is a schematic drawing illustrating a construction of a laser copier according to the present invention.

Referring now to the drawings, wherein like reference numerals designate identical or corresponding parts throughout the several views, an example of the present invention is described below. FIG. 1 is a schematic drawing illustrating a construction of a laser copier that includes a ventilating device according to the present invention.

Reference numeral 10 denotes a main body of a copier. In the main body of the copier 10, a drum-shaped image bearing member 11 (i.e., photoconductive element) is provided. Around the image bearing member 11, a charging device 12, a developing device 13, a transfer/conveying device 14, a cleaning device 15, and so forth are arranged.

A writing device 16 is provided above the above-described components. The writing device 16 includes scanning optical components, such as a light source 40 (e.g., a laser diode), a polygon mirror 41, a polygon motor 42, an fθ lens 43, and a mirror 44. For example, the fθ lens 43 is formed of polycarbonate.

A fixing device 17 is provided on the left side of the cleaning device 15 in FIG. 1. The fixing device 17 includes a fixing roller 18 that includes a heater disposed inside, and a pressure roller 19 that press-contacts with the fixing roller 18 from a downward direction of the fixing roller 18.

In an upper portion of the main body of the copier 10, an original document reading device 20 is provided. The original document reading device 20 includes a light source "a", a plurality of mirrors "b", an imaging lens "c", and an image sensor "d" such as a CCD.

In a lower portion of the main body of copier 10, a duplex unit 22, and sheet feeding cassettes 23 (which are vertically arranged) are provided. A sheet conveying path is provided to each of the duplex unit 22 and sheet feeding cassettes 23 such that a transfer sheet is conveyed to a sheet feeding path 24 that is extended to the image bearing member 11. When the transfer sheet is conveyed to the duplex unit 22, the transfer sheet discharged from the fixing device 17 is conveyed to a sheet reversing path 26 that branches out from a sheet discharging path 25.

A platen 27 is arranged on an upper surface of the main body of copier 10. An automatic document feeding device 28 is provided on the main body of copier 10 such that it covers the platen 27. The automatic document feeding device 28 may be opened/closed with respect to the main body of copier 10.

A manual transfer sheet feeding device 29 is provided to the right side of the main body of copier 10. A transfer sheet supplied from the manual transfer sheet feeding device 29 is conveyed to the sheet feeding path 24. The manual sheet feeding device 29 can be opened/closed with respect to the main body of copier 10. A sorter 30 is installed to the left side of the main body of copier 10 to receive a transfer sheet discharged through the sheet discharging path 25. The main body of copier 10 is placed on a sheet feeding table 31. In the sheet feeding table 31, the sheet feeding cassettes 23 are vertically arranged.

When a printing operation is performed with this laser copier, an original document is placed on the automatic document feeding device 28 or the original document is manually placed directly on the platen 27 while opening the automatic document feeding device 28. Then, when a start button (not shown) is pressed to activate the automatic document feeding device 28, the original document is conveyed onto the platen 27 where an image of the original document is read pixel by pixel by the original document reading device 20. When the original document is manually placed directly on the platen 27, the image of the original document is read by the original document reading device 20 in the manner similar to that when the original document is fed by the automatic document feeding device 28.

A sheet feeding roller 33 rotates to feed a transfer sheet from one of the corresponding sheet feeding cassettes 23 arranged vertically in the sheet feeding table 31. The transfer sheet is conveyed to the sheet feeding path 24. The transfer sheet is then conveyed by a sheet feeding roller 34 to a registration roller 35. The registration roller 35 rotates and conveys the transfer sheet to the image bearing member 11 with a timing in synchronization with a rotation of the image bearing member 11.

The transfer sheet may be supplied from the manual transfer sheet feeding device 29. The transfer sheet placed on the opened manual transfer sheet feeding device 29 is conveyed to the sheet feeding path 24 by a rotation of a sheet feeding roller 36. The transfer sheet is then conveyed to the image bearing member 11 in the manner similar to that described above.

When the start button (not shown) is pressed, the image bearing member 11 starts rotating in a clockwise direction in FIG. 1. The charging device 12 uniformly charges a surface of the image bearing member 11 at the same time when the image bearing member 11 starts rotating. The writing device 16 emits a laser beam L modulated according to image data generated by the original document reading device 20 so as to expose the surface of the image bearing member 11. Thus, an electrostatic latent image is formed on the surface of the image bearing member 11 which is then developed into a visible image with toner by the developing device 13.

The visible image is then transferred onto a transfer sheet, which is conveyed to the image bearing member 11 by the transfer/conveying device 14. Residual toner remaining on the surface of the image bearing member 11 is removed by the cleaning device 15 to clean the surface of the image bearing member 11 for the following image forming operation.

The transfer sheet having the transferred visible image is conveyed to the fixing device 17 by the transfer/conveying device 14. The fixing device 17 fixes the visible image onto the transfer sheet while heat and pressure are applied by the fixing roller 18 and pressure roller 19. The transfer sheet is conveyed to the sorter 30 through the sheet discharging path 25 such that the transfer sheet is discharged while being sorted.

When an image is recorded on both surfaces of a transfer sheet, the transfer sheet is conveyed to the sheet reversing path 26 from the sheet discharging path 25. The transfer sheet is then conveyed to the duplex unit 22 in which the transfer sheet is reversed and conveyed to the sheet feeding path 24. An image formed on the surface of the image bearing member 11 is transferred onto a back surface of the transfer sheet by the transfer/conveying device 14. The image transferred on the back surface of the transfer sheet is then fixed by the fixing device 17. Hence, the transfer sheet is discharged to the sorter 30.

Figure 2:
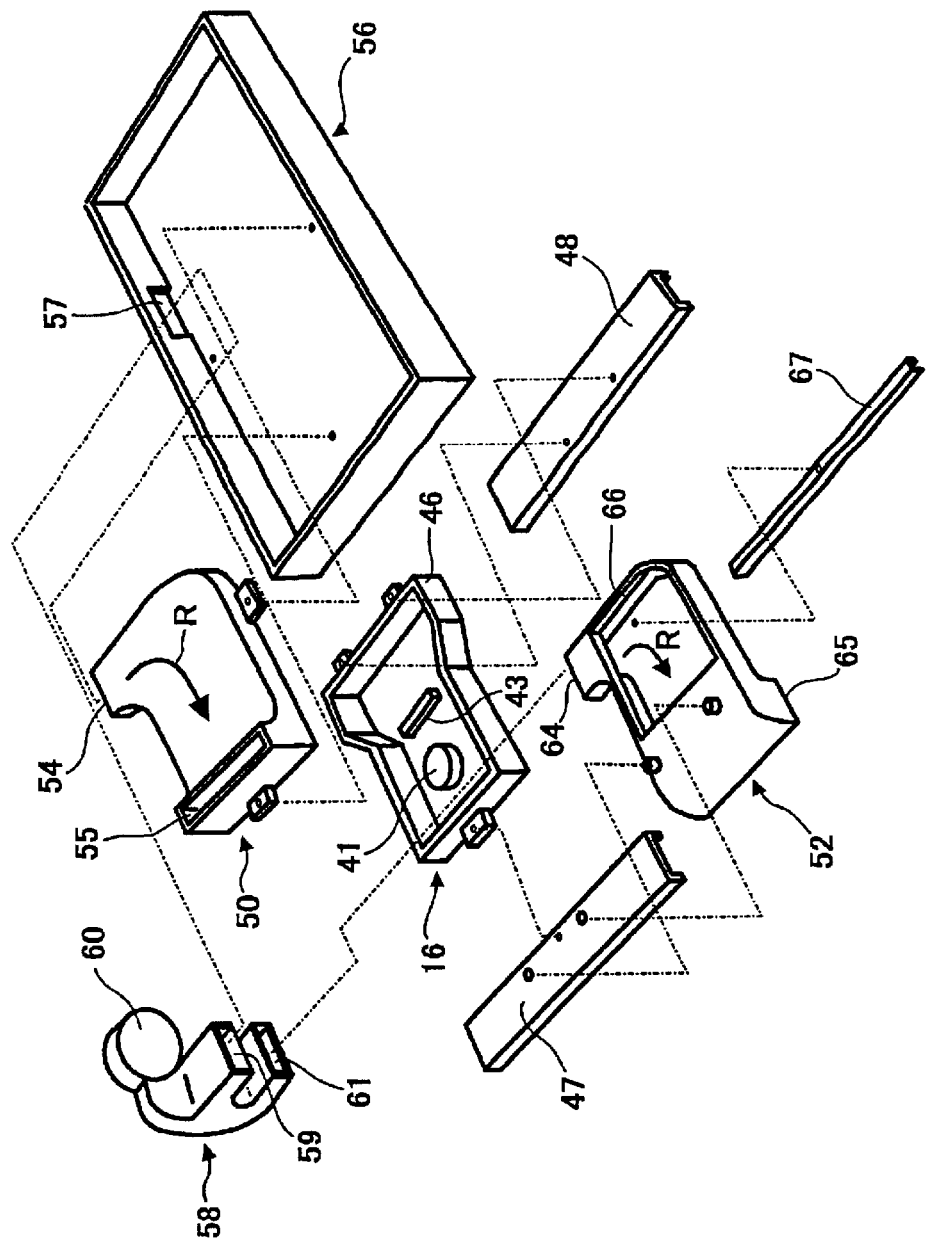
FIG. 2 is a drawing illustrating an exploded view of a writing device and surrounding components used in the laser copier.
Figure 3:
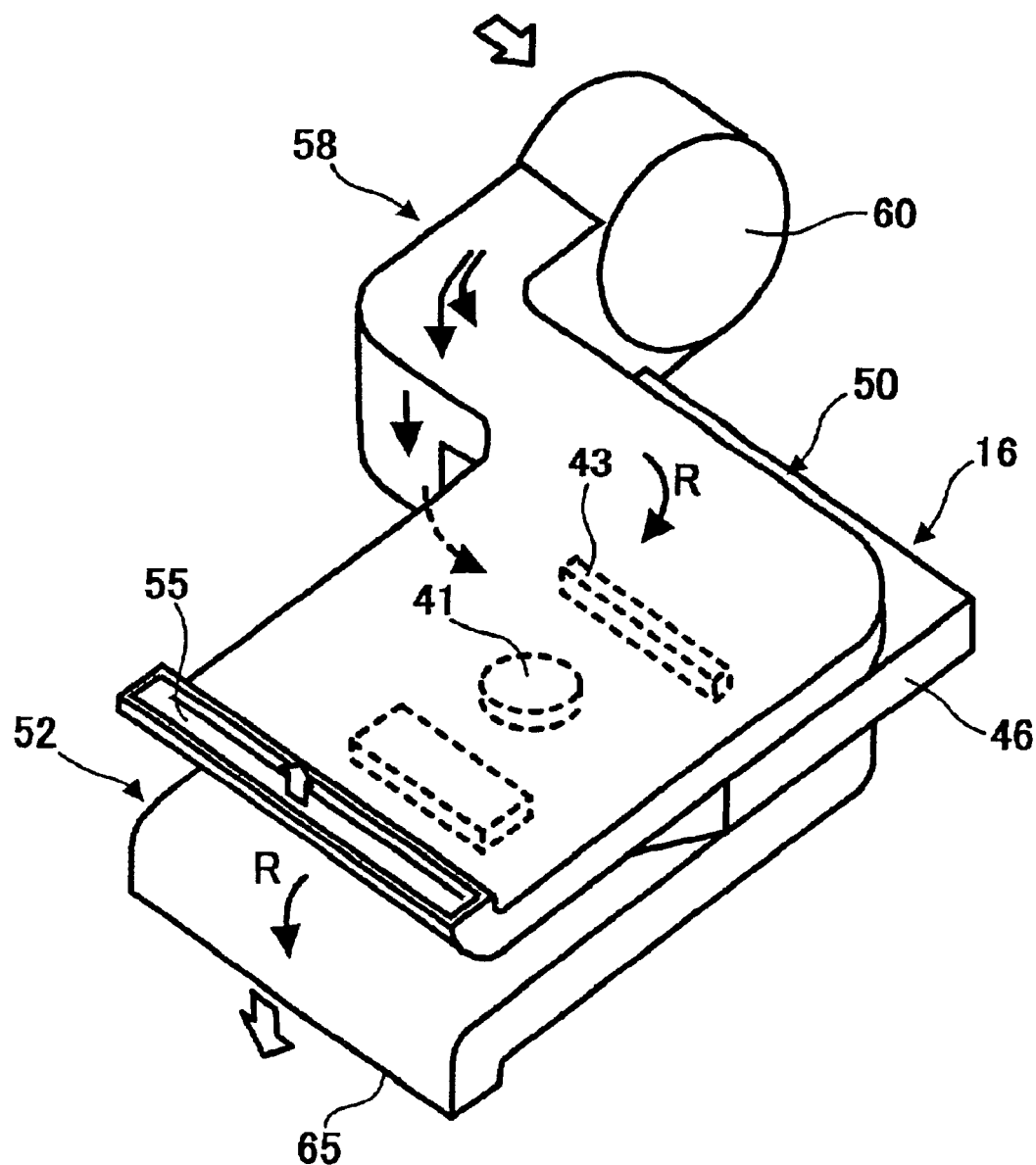
FIG. 3 is a drawing illustrating a perspective view of the writing device and surrounding components that are assembled.
Figure 4:
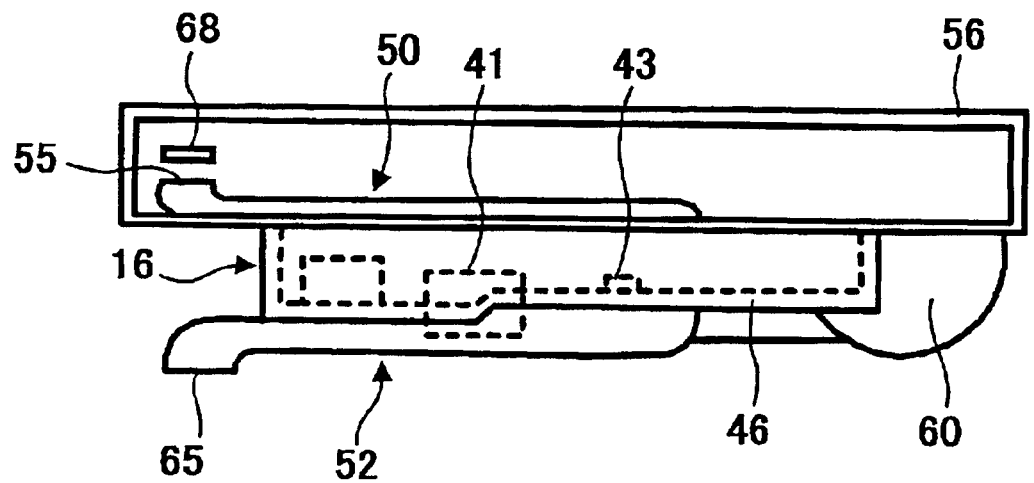
FIG. 4 is a drawing illustrating a front view of the assembled writing device and surrounding components.

FIG. 2 is a drawing illustrating an exploded view of the writing device 16 and surrounding components. FIG. 3 is a drawing illustrating a perspective view of the writing device 16 and surrounding components that are assembled. FIG. 4 is a drawing illustrating a front view of the assembled writing device 16 and surrounding components.

The writing device 16 includes a housing 46 made of an aluminum die casting with an upper side open. The housing 46 includes the polygon mirror 41, the polygon motor 42, the fθ lens 43, the mirror 44, and the light source 40.

The housing 46 is fixed to frames 47 and 48 by screws.

The frames 47 and 48 are provided in parallel to side plates (not shown), which are disposed inside the apparatus.

An upper duct 50 and a lower duct 52 are provided to the writing device 16 having the housing 46 therebetween such that the upper duct 50 covers a whole upper part of the housing 46 and the lower duct 52 covers a whole lower part of the housing 46. With this arrangement, an outside-air flowing path R is formed above and underneath the housing 46. The upper and lower ducts 50 and 52 may be formed of polystyrene, polycarbonate or other appropriate materials.

The upper duct 50 includes a connection opening 54 arranged in a side direction, an air outlet 55 arranged in an upward direction, and a large opening on its lower surface (not shown). The upper duct 50 is brought into intimate contact with a bottom surface of a scanner frame 56 of the original document reading device 20 while sealing a circumference of the large opening with a sponge, for example. The upper duct 50 is fixed to the scanner frame 56 by screws such that the large opening of the upper duct 50 is covered by the scanner frame 56. Thus, air flowing in the duct does not leak out of the large opening.

The scanner frame 56 is supported by a frame (not shown) in the main body of copier 10. In the scanner frame 56, the light source "a", the plurality of mirrors "b", the imaging lens "c", and the image sensor "d" such as a CCD are arranged. The scanner frame 56 covers the open upper side of the housing 46.

A side hole 57 is arranged in the scanner frame 56 at a position corresponding to the connection opening 54 of the upper duct 50. An upper fan connection opening 59 of an air blowing device, for example, a fan unit 58 is connected to the upper connection opening 54 of the upper duct 50 through the side hole 57 while sealing the upper connection opening 59 with a sealing member. The fan unit 58 includes an air intake fan 60, and upper and lower fan connection openings 59 and 61. The fan unit 58 is supported by a frame (not shown) provided in the main body of copier 10.

The lower duct 52 includes a lower connection opening 64 arranged in a side direction, an air outlet 65 arranged in a downward direction, a large opening 66 on an upper surface thereof. The lower duct 52 is brought into intimate contact with a bottom surface of the housing 46 while sealing a circumference of the opening 66 with a sponge, for example. The lower duct 52 is fixed to the frame 47 which supports the housing 46, and a frame 67 by screws such that the opening 66 is covered by the housing 46. Thus, air flowing in the duct does not leak out of the opening 66.

The lower fan connection opening 61 of the fan unit 58 is connected to the lower connection opening 64 of the lower duct 52 while sealing the lower fan connection opening 61.

When the main body of copier 10 start operating, the air intake fan 60 starts operating to take outside-air into the main body of copier 10. The outside-air intaken by the single air intake fan 60 flows into the upper and lower ducts 50 and 52, separately. The outside-air is then discharged out of the main body of copier 10 through the air outlets 55 and 65.

As a result, the outside-air flowing through the outside-air flowing path R absorbs heat generated in the writing device 16 and cools two sides of the writing device 16, thereby preventing a thermal expansion of the components arranged in the writing device 16. Thus, an occurrence of an image distortion and image degeneration is prevented. According to the example of the present invention, the outside-air flowing through the upper duct 50 directly cools the scanner frame 56 through the opening. The outside-air flowing through the lower duct 52 directly cools the housing 46 through the opening 66. Thus, a cooling efficiency of the upper and lower ducts 50 and 52 is increased, resulting in a greater cooling efficiency.

The outside-air that is discharged from the air outlet 55 of the upper duct 50 may then cool a lamp regulator 68 (i.e., a regulator for the light source "a") illustrated in FIG. 4. Then, the outside-air is discharged out of the main body of copier 10.

Figure 5:
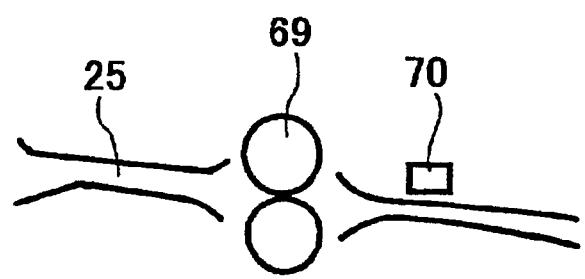
FIG. 5 is a drawing illustrating a fragmentary enlarged view of a sheet discharging path.

The outside-air discharged from the air outlet 65 of the lower duct 52 flows into the sheet discharging path 25 and to a photointerrupter 70 illustrated in FIG. 5 so as to cool the sheet discharging path 25 and photointerrupter 70. Reference numeral 69 in FIG. 5 denotes a pair of sheet conveying rollers.

As described above, when outside-air that flowed through one of or both of the upper and lower ducts 50 and 52 is also used to cool components other than the writing device 16 in the main body of copier 10, a cooling operation of the main body of copier 10 is effectively performed without increasing the number of fans.

The temperature of intaken outside-air that cools the writing device 16 increases to a range of about 40° C. to about 50° C. higher than a temperature of outside-air. However, a sufficient cooling effect is produced because a temperature of the lamp regulator 68 and photointerrupter 70 is increased to approximately 80° C.

The outside-air that cooled the writing device 16 may be used to cool an electric component or unit, such as the fixing device 17 and the duplex unit 22, which are heated to a temperature higher than that of the outside-air that flowed through the upper and lower ducts 50 and 52, without limiting cooling of the above-described lamp regulator 68 and photointerrupter 70.

In addition, the outside-air that flows through one of or both of the upper and lower ducts 50 and 52 may be used to remove ozone produced, for example, by the charger 12 and transfer/conveying device 14.

With this arrangement, the outside-air that cooled the writing device 16 is effectively used for a purpose other than cooling without increasing the number of fans.

According to the example of the present invention, the writing device 16 includes scanning optical components formed of a plastic, such as the fθ lens 43 and mirror 44. Because outside-air that flows through the outside-air flowing path R minimizes an increase of a temperature of the scanning optical components, scanning optical components formed of a plastic are employed as an alternative to components formed of a glass (often at a higher cost than plastic), resulting in a reduction in costs of the writing device 16.

In the above-described example, outside-air intaken by the single air intake fan 60 flows through the upper and lower ducts 50 and 52, thus an expansion of components in the writing device 16 is effectively minimized and may be suppressed employing the single air intake fan 60 without increasing costs.

Figure 6:
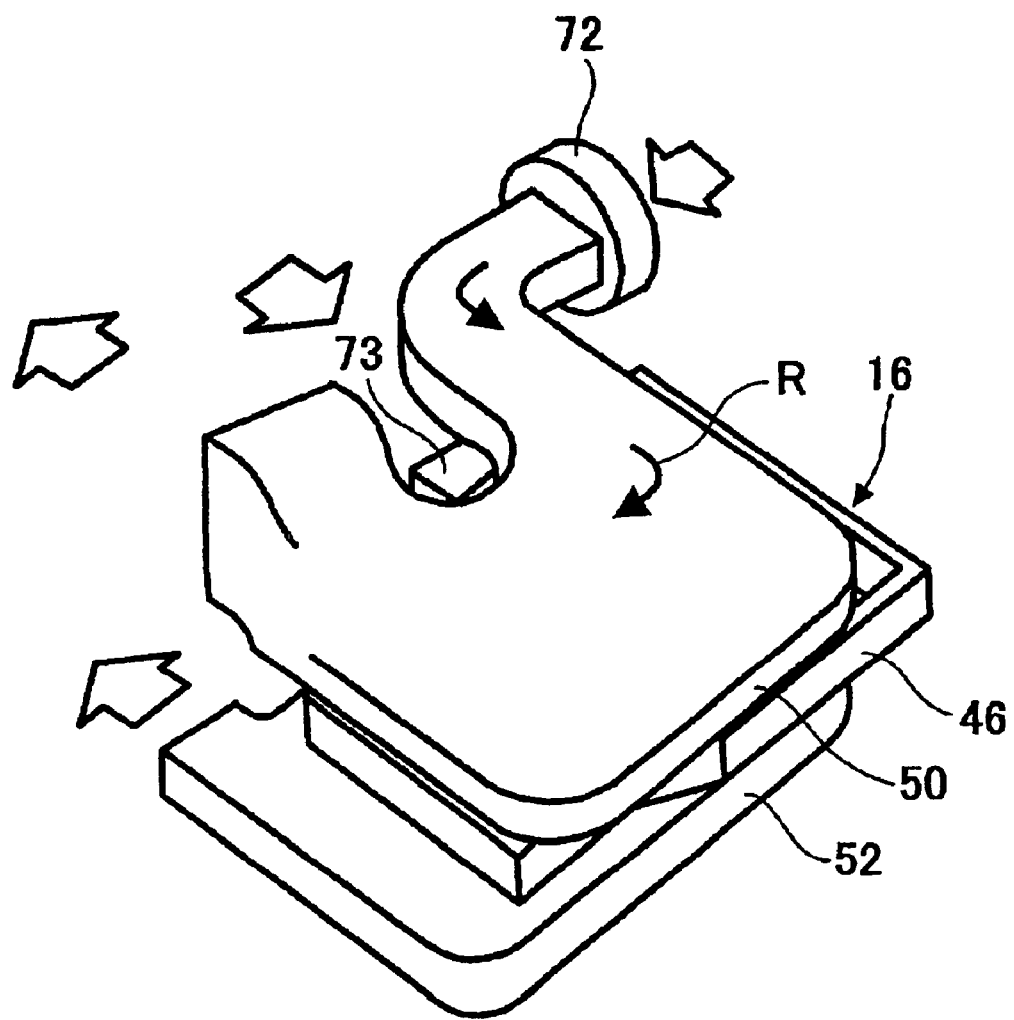
FIG. 6 is a drawing illustrating a perspective view of another example of an assembled writing device and surrounding components.
Figure 7:
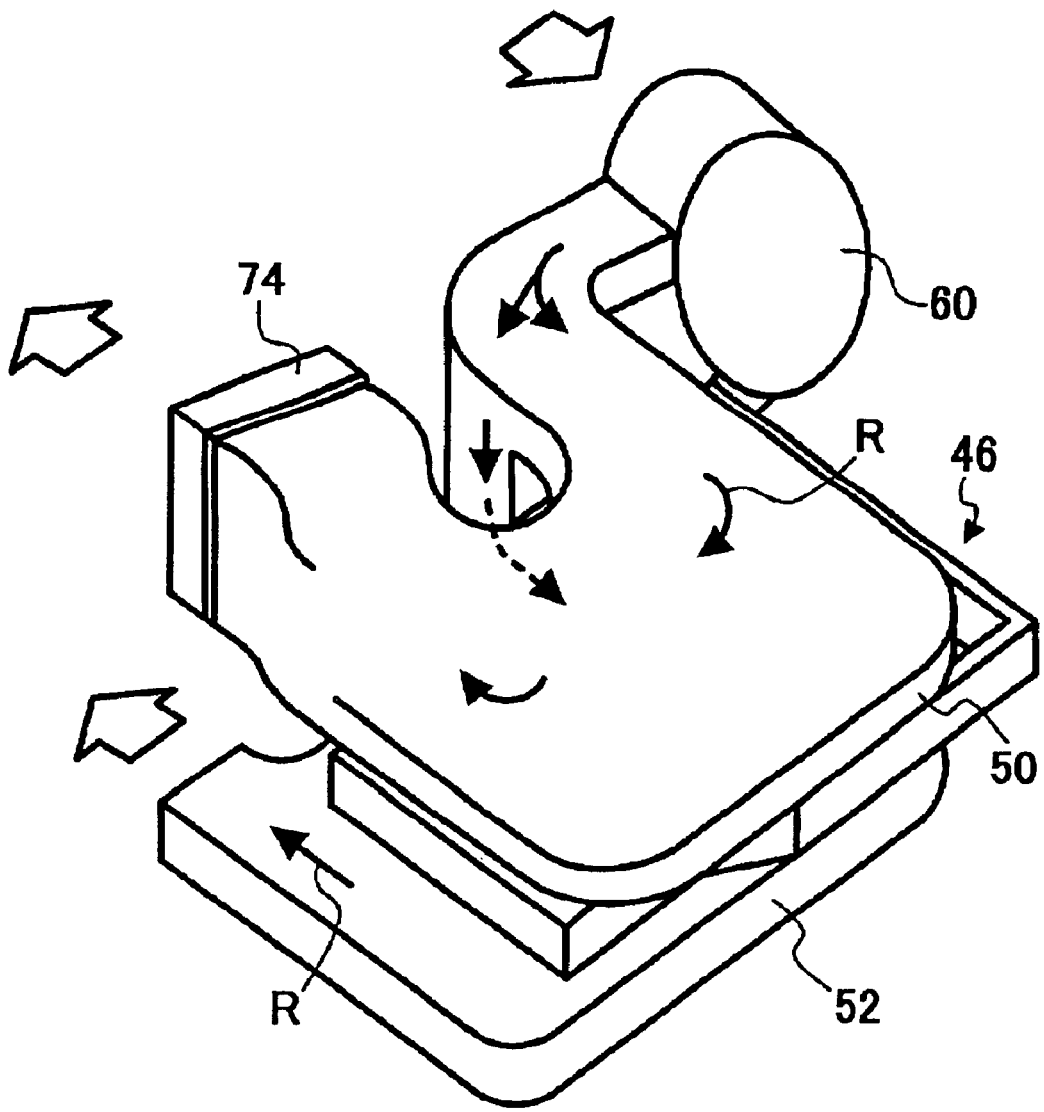
FIG. 7 is a drawing illustrating a perspective view of another example of an assembled writing device and surrounding components.

As illustrated in FIG. 6, more than one air intake fan may be used. Air intake fans 72 and 73, for example, may be provided to the upper and lower ducts 50 and 52, respectively. It should be appreciated that alternatively or additionally, a fan may be provided to an air discharging outlet instead of to the air intaking inlet. As illustrated in FIG. 7, the air intake fan 60 and an air discharge fan 74 may be provided to the upper duct 50. When fans are provided to both the air intake inlet and air discharge outlet of one of or both of the upper and lower ducts 50 and 52, further cooling may result.

Figure 8:
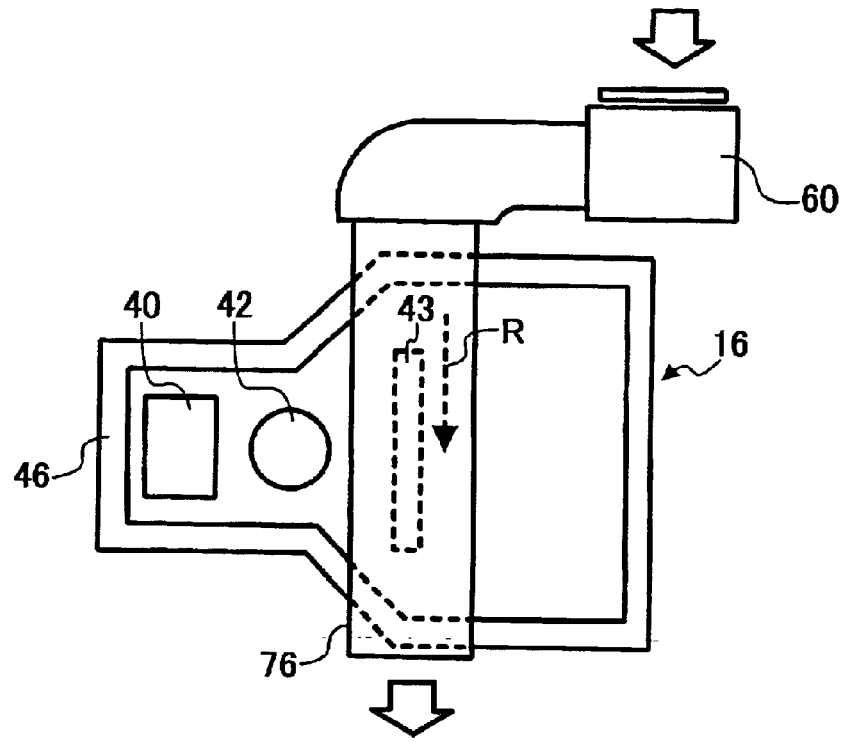
FIG. 8 is a drawing illustrating a plan view of another example of an assembled writing device and surrounding components.

When a cooling device that covers the whole of the writing device 16 is not employed, an upper and lower duct 76 may be provided to form the outside-air flowing path R as illustrated in FIG. 8. The outside-air flowing path R is provided to locally cover upper and lower sides of the housing 46 at a position corresponding to the fθ lens 43. Reference numerals 40, 42, and 60 in FIG. 8 represent the light source such as a laser diode, polygon motor, and air intake fan, respectively.

It has been confirmed by experiment that a temperature around the fθ lens 43 is increased to about 48.6° C. in the writing device 16 when the upper and lower duct 76 is not employed. When the upper and lower duct 76 is provided, the temperature is increased to 42.5° C., resulting in lowering the temperature by 6.1° C.

As described above, even when sufficient space is not available in a layout, a local cooling is performed through the housing 46. Thus, an excessive rise of a temperature of scanning optical components is minimized or suppressed, thereby effectively preventing a thermal expansion of the components. Hence, a generation of an image distortion and an occurrence of an image degeneration are prevented. Then, the scanning optical components formed of a plastic can be employed, resulting in a reduction in costs.

Figure 9:
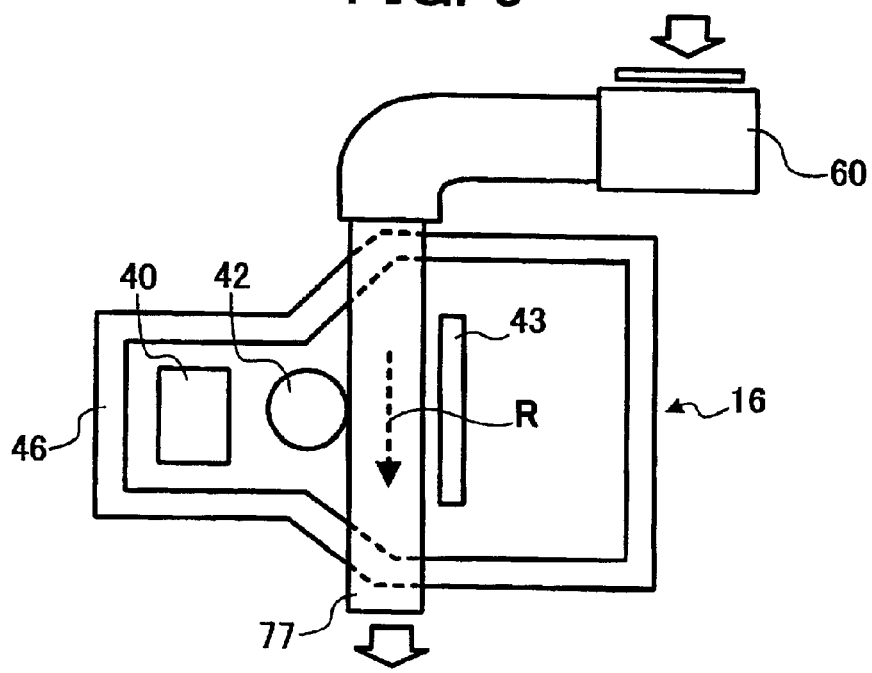
FIG. 9 is a drawing illustrating a plan view of another example of an assembled writing device and surrounding components.

When sufficient space is not available to provide the outside-air flowing path R to a position corresponding to the scanning optical components, the outside-air flowing path R formed by a duct 77 may be provided to a position illustrated in FIG. 9. In FIG. 9, the duct 77 is provided to upper and lower sides of the housing 46 of the writing device 16 at a position corresponding to space formed between the fθ lens 43 and the light source 40 or the polygon motor 42 so as to form the outside-air flowing path R.

Thus, outside-air flowing through the outside-air flowing path R locally cools the writing device 16. Then, a heat source, such as the light source 40 and polygon motor 42 do not have an excessive thermal impact on scanning optical components such as the fθ lens 43, thereby an excessive temperature rise of the scanning optical components is prevented or minimized. A thermal expansion of the scanning optical components may be effectively suppressed. Thus, a generation of an image distortion and an occurrence of an image degeneration are prevented or minimized. Then, the scanning optical components formed of a plastic may be employed, resulting in a reduction in costs. With this arrangement, the scanning optical components are minimally affected by a thermal impact of a heat source other than the writing device 16, such as the fixing device 17.

Obviously, numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2001-003980, filed on Jan. 11, 2001, Japanese Patent Application No. 2001-041112, filed on Feb. 19, 2001, and Japanese Patent Application No. 2001-380871, filed on Dec. 14, 2001, and the entire contents thereof are herein incorporated by reference.

What is claimed as new and is desired to be secured by Letters Patent of the United States is:

1. An image forming apparatus, comprising:
a writing device including scanning optical components configured to write and form an image on a surface of an image bearing member;
a developing device configured to develop the image formed on the surface of the image bearing member;
an upper duct provided above and a lower duct provided beneath a housing of the writing device to form an outside-air flowing path; and
a single air intake fan configured to take outside-air into the upper duct and the lower duct.

2. The image forming apparatus according to claim 1, wherein an opening is provided to the lower duct such that the opening is covered by the housing.

3. The image forming apparatus according to claim 1, wherein an open upper side of the housing is covered by a scanner frame of an original document reading device, and wherein the upper duct is provided in the scanner frame.

4. The image forming apparatus according to claim 3, wherein an opening is provided to the upper duct and is covered by the scanner frame.

5. The image forming apparatus according to claim 1, wherein a fan is provided to an air discharge outlet at least one of the upper duct and the lower duct.

6. The image forming apparatus according to claim 1, wherein scanning optical components formed of a plastic are used in the writing device.

7. The image forming apparatus according to claim 1, wherein outside-air that flows through at least one of the upper duct and the lower duct is used to cool components other than the writing device.

8. The image forming apparatus according to claim 1, wherein outside-air that flows through at least one of the upper duct and the lower duct is used to remove ozone produced in the image forming apparatus.

9. An image forming apparatus, comprising:
means for writing and forming an image on a surface of an image bearing member, wherein said means for writing and forming an image includes scanning optical components;
means for developing the image formed on the surface of the image bearing member; and
an upper duct provided above and a lower duct provided beneath a housing of the writing means to form an outside-air flowing path; and
means for taking outside-air into the upper duct and the lower duct.

10. The image forming apparatus according to claim 9, wherein an opening is provided to the lower duct such that the opening is covered by the housing.

11. The image forming apparatus according to claim 9, wherein an open upper side of the housing is covered by a scanner frame of an original document reading device, and wherein the upper duct is provided in the scanner frame.

12. The image forming apparatus according to claim 11, wherein an opening is provided to the upper duct, and the opening is covered by the scanner frame.

13. The image forming apparatus according to claim 9, wherein a fan is provided to an air discharge outlet of at least one of the upper duct and the lower duct.

14. The image forming apparatus according to claim 9, wherein scanning optical components formed of a plastic are used in the writing means.

15. The image forming apparatus according to claim 9, wherein outside-air that flows through at least one of the upper duct and lower duct is used to cool components other than the writing means.

16. The image forming apparatus according to claim 9, wherein outside-air that flows through at least one of the upper duct and the lower ducts is used to remove ozone produced in the image forming apparatus.

* * * * *